United States Patent [19]

Nilsson

[11] Patent Number: 4,931,179
[45] Date of Patent: Jun. 5, 1990

[54] FILTER SECTION FOR A ROTATABLE FILTER

[76] Inventor: Bjarne Nilsson, Lanterngatan 9, S-462 00 Vänersborg, Sweden

[21] Appl. No.: 210,442

[22] Filed: Jun. 23, 1988

[30] Foreign Application Priority Data

Jun. 24, 1987 [SE] Sweden ................................. 8702617

[51] Int. Cl.⁵ .............................................. B01D 33/26
[52] U.S. Cl. ..................................... 210/331; 210/346; 210/404; 210/487
[58] Field of Search ............... 210/331, 346, 486, 487, 210/330, 326, 400, 401, 404, 322, 324, 327, 232

[56] References Cited

U.S. PATENT DOCUMENTS

| | | | |
|---|---|---|---|
| 3,438,505 | 4/1969 | Luthi | 210/486 |
| 3,917,534 | 11/1975 | Moore | 210/486 |
| 4,634,529 | 1/1987 | Nilsson | 210/331 |
| 4,686,040 | 8/1987 | Nilsson | 210/486 |

FOREIGN PATENT DOCUMENTS

| | | | |
|---|---|---|---|
| 0192620 | 8/1986 | European Pat. Off. . | |
| 587642 | 11/1933 | Fed. Rep. of Germany | 210/331 |
| 717315 | 2/1942 | Fed. Rep. of Germany . | |
| 21407218 | 5/1981 | Fed. Rep. of Germany . | |

Primary Examiner—W. Gary Jones
Assistant Examiner—Wanda L. Millard
Attorney, Agent, or Firm—Pollock, Vande Sande & Priddy

[57] ABSTRACT

A filter section for a roatatable filter of the kind including a plurality of sections (5) assembled into an annular filter disk. Each section (5) comprises two mutually spaced plate-shaped elements (6,7) which are at least partially perforated and provided with protrusions (8) keeping a filter cloth (9) spaced from the plate-shaped elements. The space between the plate-shaped elements (6,7) is in communication with a discharge conduit (2) for filtrate. At least one substantially radial drainage channel (12) is arranged between the plate-shaped elements (6,7), this channel communicating with the outlet (13) of the section. The space between the plate-shaped elements (6,7) at the side of the drainage channel (12) is filled with a hardened compound (11), and the plate-shaped elements (6,7) are provided with openings (10) towards the channel (12).

7 Claims, 1 Drawing Sheet

FILTER SECTION FOR A ROTATABLE FILTER

FIELD OF THE INVENTION

The present invention relates to a filter section for a rotatable filter of the kind including a plurality of sections assembled into an annular filter disk, each section comprising two mutually spaced plate-shaped elements, which are at least partially perforated and provided with protrusions keeping a filter cloth spaced from the surfaces of the plate-shaped elements, the space between the plate-shaped elements being in communication with a discharge conduit for filtrate.

BACKGROUND OF THE INVENTION

Rotatable filters of this kind are described, a.o., in the Patent No. SE-C-8305817-2 (corresponding to EP-B1-0160069 and US-A-4 634 529). As is well known to those skilled in the art there is a disadvantage occurring in such filters which is usually called re-wetting or "backwash", meaning that the filtrate, which has not yet had time to leave the interior of a filter section before the sub-pressure in the discharge conduit ceases, flows back again through the filter cloth. It is thus desirable that the interior volume of a filter section be kept as small as possible, so that the least possible quantity of filtrate will be able to flow back. To decrease the volume by making the space between the disk shaped elements small results in problems in strength, since a filter section is subjected to both bending and torsion, as well as flow problems, since a relatively large area is required at the outlet end of the section to permit the discharge of filtrate.

SUMMARY OF THE INVENTION

The object of the invention is consequently to provide a filter section which solves, or at least mitigates, the backflow problem without infringing on strength and flow requirements.

BRIEF DESCRIPTION OF THE DRAWINGS

The invention will now be described with reference to the accompanying drawings, in which several embodiments of the invention are shown for purposes of illustration, and in which.

DESCRIPTION OF PREFERRED EMBODIMENT

Figure 1:
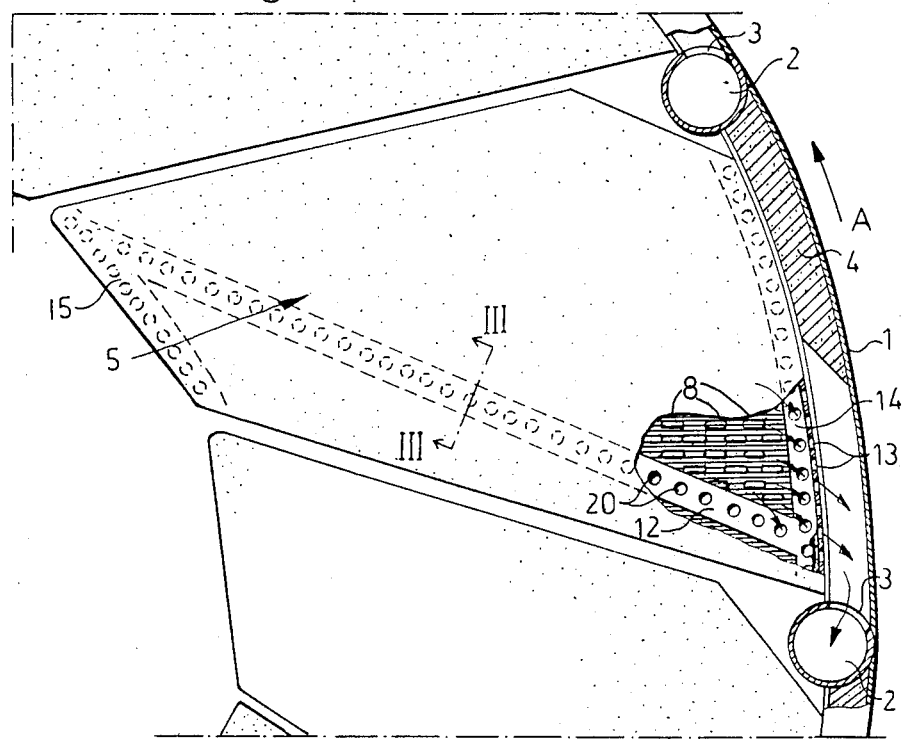
FIG. 1 shows a part of a filter rotor with a part of a filter disk assembled from a filter rotor with a part of a filter disk put together from a plurality of filter sections in accordance with the invention, one filter section being shown partly in section.

In the drawing the numeral 1 denotes part of an annular filter disk holder, which is part of a filter rotor further including axially directed filtrate conduits 2. The filter disk holder 1 has a substantially U-shaped cross-section and is welded to the axially directed conduits 2. These have an opening 3 in the direction of rotation indicated by the arrow A, but are closed in the opposite direction. From the conduits 2 and a distance against the direction of rotation A, the interior of the filter disk holder 1 is closed off with a filler compound 4, or blocked in some other way from the remainder of the filter disk holder 1. There is communication between the non-filled interior of the filter disk holder 1 and the axially directed conduits 2 via the openings 3.

A filter section 5 is mounted between two axially directed conduits 2 in the filter disk holder. This filter section conventionally comprises two disk-shaped elements 6 and 7, which are provided on their outsides with protrusions 8, which keep a filter cloth 9 spaced from the respective element surface. In accordance with the invention, the protrusions 8 are discontinuous, i.e., they are of limited length and are preferably mutually displaced between adjacent rows of protrusions (see FIG. 1). In this way, the filtrate can flow over the surfaces of the elements 6 and 7 in all directions. The elements 6 and 7 are provided with holes 10 for taking the filtrate flowing through the filter cloth 9 into the space between the elements 6 and 7.

Figure 3:
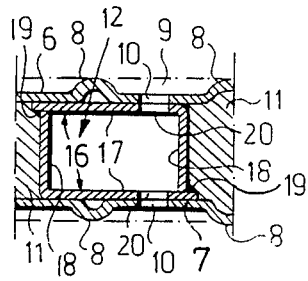
FIG. 3 is a section along line III—III in FIG. 1 to a larger scale.

In order to make the interior volume of the filter section 5 as small as possible, the space between the elements 6 and 7 is filled in accordance with the invention with a hardened compound 11 (FIG. 3). The compound 11 is preferably adhesive and has penetrated into the inside of the protrusions 8. Apart from the compound 11 filling out the interior of the filter section 5, for the purpose of reducing volume, it gives the section great resistance to compression caused by the sub-pressure provided in the section during filtering. Since the compound 11 is also on the inside of the protrusions 8, great resistance to shear between the compound 11 and the elements 6 and 7 is achieved, and thus great rigidity and torsional resistance of the section 5.

In order to ensure removal of filtrate from the spaces between the filter cloth 9 and the elements 6 and 7, in spite of the filling-out with the compound 11, at least one channel 12 is arranged inside the section 5 between the elements 6 and 7, said channel being in communication with the spaces mentioned via the holes 10 and also opening out at the outer periphery of the section, where there is communication between the unfilled portion of the filter disk holder 1 via radial holes 13.

In the embodiment illustrated in FIG. 1, a channel 12 is arranged to extend approximately diagonally through the section 5 and open out in the part of the section last leaving the liquid which is to be filtered. By virtue of this arrangement, the channel 12 is still sloping downward when the conduit 2 emerges above the liquid level. An outer peripheral channel 14 and optionally an inner peripheral channel 15 may also be arranged further to the channel 12, the former two channels being in communication both with the channel 12 and the space between the filter cloth 9 and the elements 6 and 7.

Figure 2:
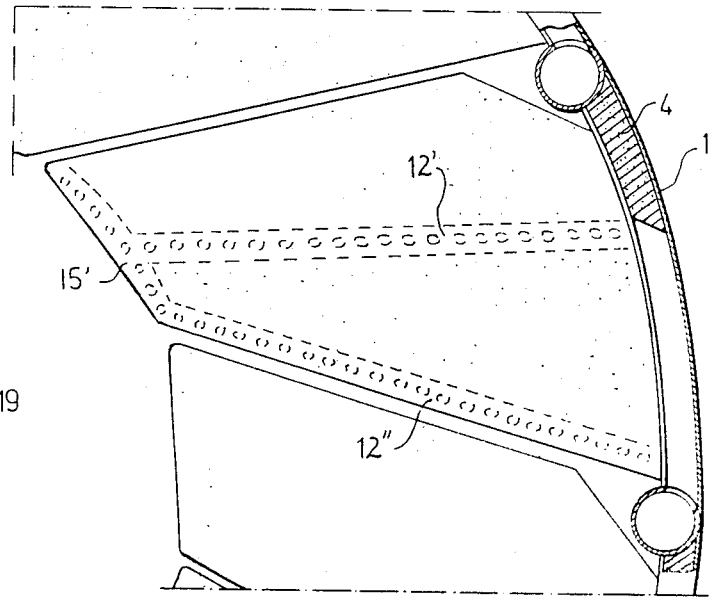
FIG. 2 shows in a similar way another embodiment of the invention.

In the embodiment illustrated in FIG. 2, two radial channels 12' and 12" are arranged, both of which communicate with an interior peripheral duct 15', the channel 12" extending along the trailing edge of the filter section, as seen in the direction of rotation.

In an unillustrated embodiment of the invention, a substantially diagonal channel, similar to the channel 12 according to FIG. 1, and a substantially radial channel, similar to the channel 12" according to FIG. 2, are arranged, both channels opening out at the outer periphery of the section close to the axially directed conduit 2. However, neither outer nor inner peripheral ducts are arranged in this embodiment.

A preferred embodiment of a channel 12 is illustrated in FIG. 3. This channel comprises two L-shaped sections 16, the legs 17 of which overlap the respective other legs 18 of the sections. Hereby the welds 19 can be located at the external angles between the legs 17 and 18. In the legs 17 are arranged holes 20 opposite the holes 10 in the elements 6 and 7. The holes 20 are preferably arranged close to the leg 18 which is uppermost when the section 5 emerges above the surface of the filtered liquid. Hereby the channel 12 under the holes 20 obtains the greatest possible capacity for removing filtrate.

I claim:

1. A filter section for a rotatable filter of the kind including a plurality of such filter sections assembled into an annular filter disk for filtering a liquid, said filter section having a radially inner peripheral edge and a radially outer peripheral edge and including two mutually spaced plate-shaped elements having outer and inner surfaces, said outer surfaces being provided with a plurality of uniformly spaced protrusions keeping a filtering medium spaced from said outer surfaces, said plurality of protrusions are spaced in a radial direction of said filter section so as to allow liquid flow therebetween in directions other than said radial direction; said inner surfaces defining a compartment within said filter section communicating with an outlet of said filter section, wherein
   (a) said compartment is completely filled with a hardened compound adhering to said inner surfaces of said plate-shaped elements;
   (b) means defining at least one substantially radial drainage channel extend from said radially inner peripheral edge to said radially outer peripheral edge through said compound between said inner surfaces of said plate-shaped elements, said drainage channel communicating with said outlet of said filter section; and
   (c) means defining openings are provided in said plate-shaped elements to establish fluid communication between said outer surfaces and said drainage channel.

2. A filter section as claimed in claim 1, wherein a first drainage duct is arranged along said outer peripheral edge of said filter section, said first drainage duct being in communication with said at least one substantially radial drainage channel.

3. A filter section as claimed in claim 2, wherein a second drainage duct is arranged along said inner peripheral edge of said filter section, said second drainage duct being in communication with said at least one substantially radial drainage channel.

4. A filter section as claimed in claim 1, wherein said at least one substantially radial drainage channel extends substantially diagonally through said filter section, a radially outward end of said at least one substantially radial drainage channel being located in a portion of said filter section last leaving said liquid upon rotation of said filter disk.

5. A filter section as claimed in claim 1, wherein said protrusions include voids in said inner surfaces of said plate-shaped elements, said hardened compound filling said voids.

6. A filter section as claimed in claim 1, wherein said means defining at least one substantially radial drainage channel comprises a first and a second elongated member each having a substantially L-shaped cros-section including a first and a second leg, said first and said second legs having longitudinally extending free edges, said two members being inter-connected such that said free edge of said first leg of said first and said second member abuts said second leg of said second and said first member, respectively, close to the respective said free edge thereof so as to form between said first and second members a laterally liquid-tight channel, holes being provided in said second leg of said first and said second member opposite to said opening defining means in said plate-shaped elements.

7. A filter section as claaimed in claim 6, wherein said first and second members are welded together along said free edges of said first and second legs.

* * * * *